US006172288B1

(12) United States Patent
Freer

(10) Patent No.: US 6,172,288 B1
(45) Date of Patent: Jan. 9, 2001

(54) CLAMP FOR A SNARE DRUM

(75) Inventor: Thomas C. Freer, Heights, OH (US)

(73) Assignee: Grover Musical Products, Inc., Cleveland, OH (US)

( * ) Notice: Under 35 U.S.C. 154(b), the term of this patent shall be extended for 0 days.

(21) Appl. No.: 09/166,728

(22) Filed: Oct. 5, 1998

Related U.S. Application Data

(63) Continuation-in-part of application No. 08/734,831, filed on Oct. 22, 1996, now abandoned.

(51) Int. Cl.[7] .............................. G01D 13/02

(52) U.S. Cl. .............................. 84/411 R; 84/415

(58) Field of Search .............................. 84/411 R, 413, 84/415; 403/DIG. 10; 248/241

(56) References Cited

U.S. PATENT DOCUMENTS

| | | | |
|---|---|---|---|
| 3,113,481 | 12/1963 | Thompson . | |
| 4,383,467 | 5/1983 | Glassford, Jr. . | |
| 4,967,634 | 11/1990 | Whynott . | |
| 5,107,742 | 4/1992 | Cummings et al. . | |
| 5,275,081 * | 1/1994 | Freer | 84/415 |
| 5,684,257 | 11/1997 | Yanagisawa . | |

* cited by examiner

*Primary Examiner*—Paul Ip
*Assistant Examiner*—Kim Lockett
(74) *Attorney, Agent, or Firm*—James A. Hudak

(57) ABSTRACT

A snare clamp assembly is disclosed that provides for the selective precise rapid engagement and disengagement of the snares against the snare head and also provides for the precise rapid adjustment of the tension within each of a plurality of snare groups without affecting the tension in the remaining snare groups. The clamp includes a primary element, a secondary element that is adjustably coupled to the primary element, and one or more engaging, disengaging and adjusting mechanisms received through the secondary element and adjustably movable therein permitting the precise rapid engagement and disengagement of a snare group against the snare head and provides for the precise rapid adjustment of tension in each snare group against the snare head. Another group of snares can be received between the primary and secondary element and adjustably clamped therebetween.

12 Claims, 9 Drawing Sheets

CLAMP FOR A SNARE DRUM

This application is a CIP of 08/734831 filed Oct. 22,1996 now abandoned.

TECHNICAL FIELD

The present invention relates, in general, to a snare system for a snare drum and, more particularly, to a clamp that provides for the selective precise rapid engagement and disengagement of the snares against the snare head without the use of tools and also provides for the selective precise rapid tensioning of the snares against the snare head.

BACKGROUND ART

Snare drums produce a sound that is quite different from that produced by other drums. This unique sound is produced by stretching snares, typically made of cable, gut, or wire across one head of the drum. The snares are generally attached to the drum shell at one end, stretched across the snare head, and attached to a strainer which is connected to the opposite side of the drum shell. The strainer operates to stretch the snares across the snare head. By selectively engaging and disengaging the snares against the snare head and/or by varying the amount of tension applied to the snares by means of a snare strainer, a drummer can change the sound produced by the snare drum. Various devices are available for adjusting the tension within the snares themselves, however, these devices require the use of tools, such as Allen wrenches, screw drivers, or the like, and are virtually impossible to employ while the drummer is performing on the instrument. In addition to being very cumbersome to use, such tools prohibit the drummer from making precise rapid adjustments to the individual snare groups as musical and artistic circumstances dictate. Furthermore, these devices do not provide for the selective precise rapid engagement and disengagement of the snares against the snare head, when desired, while performing.

In view of the foregoing, it has become desirable to develop an improved snare system including a snare clamp which utilizes a minimum number of components, is operable without the use of tools, and which enables the drummer to rapidly and precisely engage and disengage the snares against the snare head and which permits the drummer to make precise rapid adjustments to the tension within the snare groups while performing.

SUMMARY OF THE INVENTION

The present invention solves the problems associated with prior art snare clamping devices and other problems by providing a snare drum clamping device which provides for the selective rapid engagement and disengagement of the individual snares against the snare head and also provides for the precise rapid tensioning of the snares against the snare head without the use of tools and while the drummer is performing. The clamping device is comprised of a primary element and a secondary element retained in an abutting relationship by fasteners passing therethrough. One or more screws having threads over a portion of their length are received within through bores located adjacent the outer ends of either the secondary element or primary element. A hand nut engages the threaded end of each of the screws. The opposite end of the screw has a cross-drilled bore therethrough. The ends of a first snare group are attached to a snare clasp having a connecting cable passing therethrough which is received through the cross-drilled bore in the opposite end of the screw. Similarly, the ends of a second snare group are attached to another snare clasp having a connecting cable passing therethrough which is received through the cross-drilled bore in the opposite end of another screw. By rotating the hand nut associated with each screw, the snare groups can be selectively engaged and/or disengaged against the snare head and the tension within each of the snare groups can be precisely adjusted. After the snare groups have been engaged against the snare head and the tension has been precisely adjusted, the tension within the snare group is maintained since the orientation of the hand nut with respect to its respective threaded screw will not change unless the hand nut is turned by the drummer. In addition, the snare group can be selectively engaged and disengaged against the snare head by merely rotating the hand nut a pre-determined number of turns. The ends of the third snare group are received between the primary element and the secondary element and are held therein in a vise-like arrangement thus preventing the tension within this group of snares from changing. In an alternate embodiment of the present invention, the first and/or second group of snares can be attached to the secondary element by means of a connecting cable attached to the snare clasp and having its ends received within a through bore in the secondary element and retained therein by means of a fastener received within a threaded blind bore in the secondary element. In still another alternate embodiment, only a singular element, rather than a primary element and secondary element, is utilized and one or more snare engagement, disengagement and precision adjusting means comprised of the aforementioned screw and hand nut arrangement is similarly employed. Alternatively, either one or both of the screws and hand nuts can be eliminated and the ends of the connecting cable which passes through the snare clasp can be received within a through bore in the singular element and retained therein by means a fastener received within a threaded blind bore in the secondary element.

DETAILED DESCRIPTION OF THE PREFERRED EMBODIMENT

Figure 1:
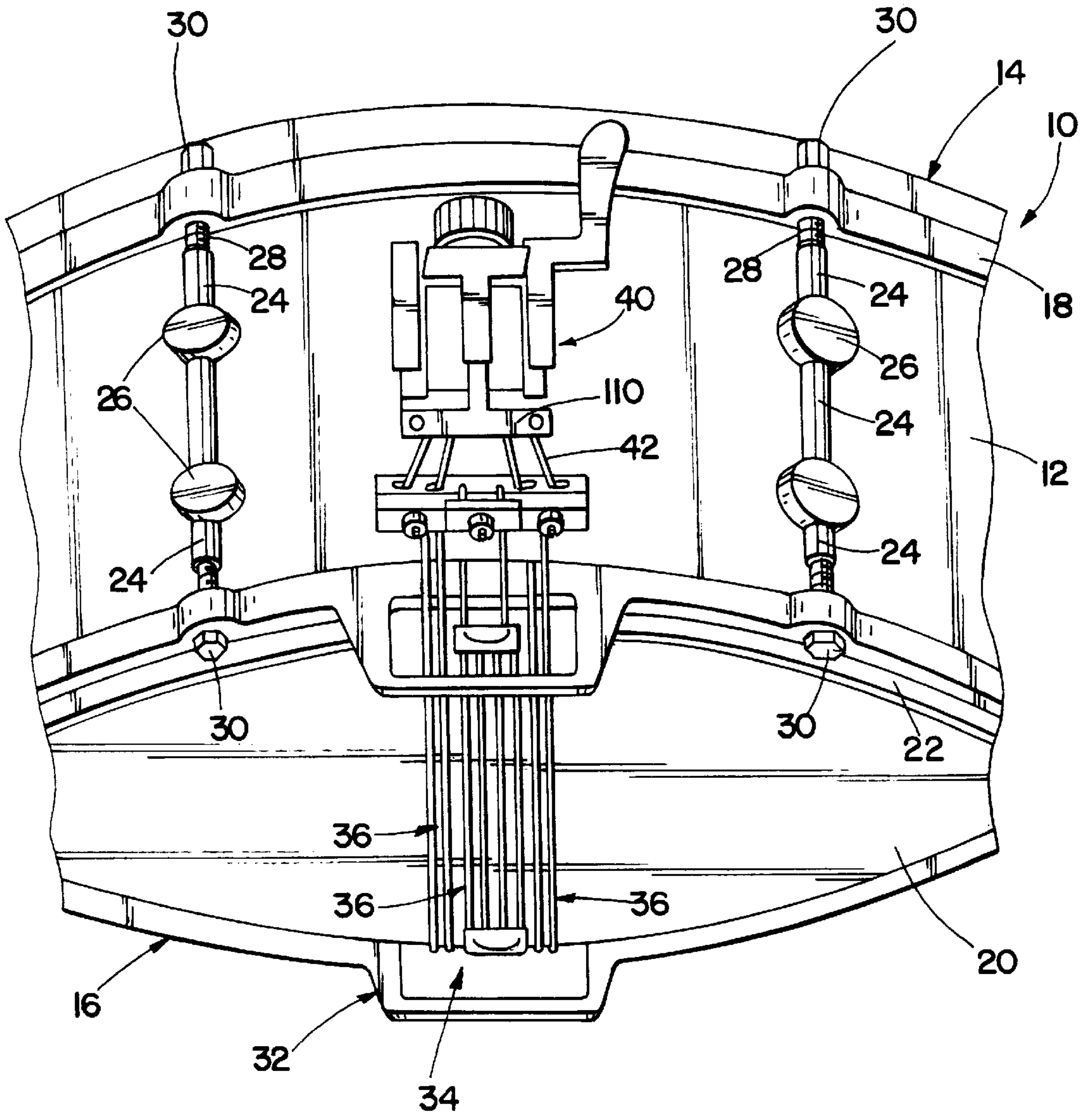
FIG. 1 is a perspective view of a portion of a snare drum showing snares attached to an improved snare clamp in accordance with the present invention.

Referring now to the drawings where the illustrations are for the purpose of describing the preferred embodiment of the present invention and are not intended to limit the invention described herein, FIG. 1 is a perspective view of a portion of a snare drum 10 including a shell 12 having a batter end 14 and an oppositely disposed snare end 16. A batter head (not shown) is attached to batter end 14 by a batter rim 18 and a snare head 20 is attached to snare end 16 by a snare rim 22. Batter rim 18 and snare rim 22 are pulled toward one another by tension rods 24 which are aligned and held in place by passing through lugs 26 which are attached to shell 12. Rims 18 and 22 are positioned over batter end 14 and snare end 16, respectively, so that tension rods 24 are aligned with apertures 28 formed in rims 18 and 22. Tension rods 24 are received through apertures 28, and nuts 30 threadingly engage tension rods 24 pulling rims 18 and 22 toward one another, thereby fastening the batter head (not shown) and snare head 20 to batter end 14 and snare end 16, respectively. Snare rim 22 is formed to include a snare gate 32 having an aperture 34 therein through which the snares 36 can pass. A strainer 40 is provided to apply tension to snares 36 or to release the amount of tension being applied thereto. Snares 36 are attached to an improved snare clamp, which is the subject of this invention and which has numerous embodiments, hereinafter described. The improved snare clamp is, in turn, attached to strainer 40 by connecting cables 42.

Figure 2:
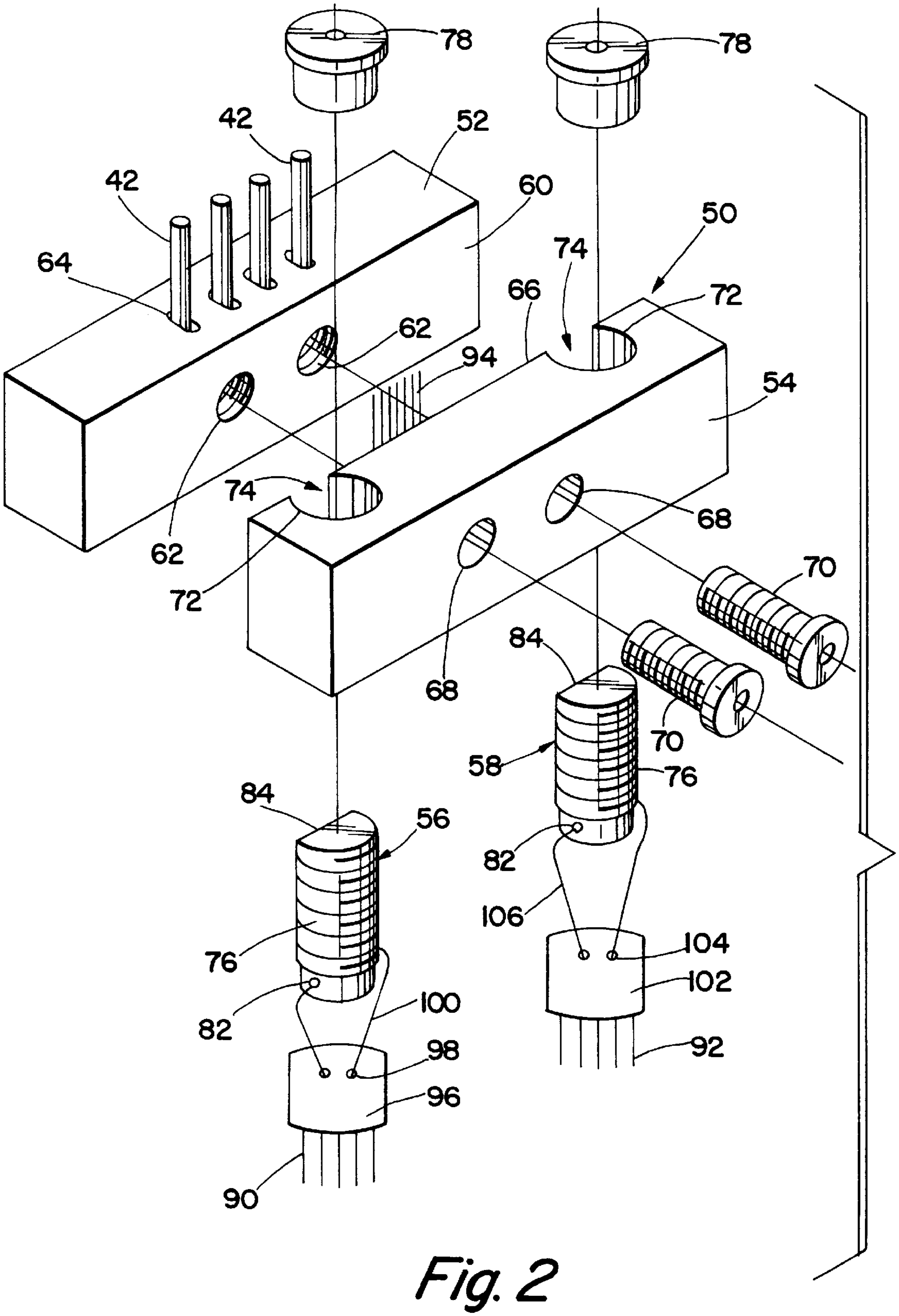
FIG. 2 is an exploded perspective view of a first embodiment of an improved snare clamp of the present invention.

Referring now to FIG. 2, a first embodiment of an improved snare clamp 50 of the present invention is illustrated. Clamp 50 includes a primary element 52, a secondary element 54, a first snare engaging, disengaging and adjusting mechanism 56 and a second snare engaging, disengaging and adjusting mechanism 58. Primary element 52 has a gripping surface 60 and spaced-apart threaded bores 62 formed therein and positioned so as to be substantially perpendicular to gripping surface 60. Two pairs of cable-receiving bores 64 are provided in primary element 52 and are positioned so as to be substantially perpendicular to threaded bores 62 and are located so that a threaded bore 62 is positioned between each pair of cable-receiving bores 64.

Secondary element 54 has a gripping surface 66 positioned so as to operably abut gripping surface 60 of primary element 52. Through bores 68 are formed in secondary element 54 and are positioned so as to be coaxially aligned with threaded bores 62 in primary element 52. Allen screws 70 are received within bores 68 in secondary element 54 and threadingly engage threaded bores 62 in primary element 52 causing gripping surface 60 on primary element 52 to be drawn toward gripping surface 66 on secondary element 54 as Allen screws 70 are threadingly advanced within threaded bores 62. With Allen screws 70 operably positioned and threadingly engaging primary element 52, gripping surfaces 60, 66 on primary element 52 and secondary element 54, respectively, are aligned to operably abut one another. Secondary element 54 is also provided with a through bore 72 at either end thereof and positioned outwardly of and substantially perpendicular to the axis of bores 68. Through bores 72 are positioned so that their respective axes are substantially parallel to gripping surface 66 on secondary element 54 and are located such that a chord thereof, shown generally by the numeral 74, is coincident with gripping surface 66. First snare engaging, disengaging and adjusting mechanism 56 is received within a bore 72 positioned at one end of secondary element 54 and second snare engaging, disengaging and adjusting mechanism 58 is received within the bore 72 positioned at the other end of secondary element 54. Both first and second snare engaging, disengaging and adjusting mechanisms 56, 58 include a screw 76 having threads over a portion thereof which are engaged by a hand nut 78. The opposite end 80 of screw 76 is unthreaded, substantially cylindrical in configuration, and has a cross-drilled bore 82 therethrough. A flat 84 is provided over the entire length of screw 76 providing a chord having the approximate same dimension as chord 74 in bore 72. The plane of flat 84 is substantially parallel to the axis of cross-drilled bore 82. It should be noted that even though first snare engaging, disengaging and adjusting mechanism 56 and second snare engaging, disengaging and adjusting mechanism 58 are shown as being received within oppositely disposed bores 72 in secondary element 54, oppositely disposed bores 72 could be placed outwardly of cable-receiving bores 64 in primary element 52, rather than in secondary element 54, without any change in the operation of the snare clamp 50. In this latter instance the width of secondary element 54 could be narrower than that shown in FIG. 2.

Snares 36 can be divided into three groups, a first snare group 90, a second snare group 92 and a third snare group 94. The ends of first snare group 90 are attached to a snare clasp 96 having spaced-apart apertures 98 therein. A connecting cable 100 is received through cross-drilled bore 82 in screw 76 of first snare engaging, disengaging and adjusting mechanism 56 and each end of connecting cable 100 is received through one of the apertures 98 in snare clasp 96 and then knotted so as to engage clasp 96. Similarly, the ends of second snare group 92 are attached to a snare clasp 102 having spaced-apart apertures 104 therein. A connecting cable 106 is received through cross-drilled bore 82 in screw 76 of second snare engaging, disengaging and adjusting mechanism 58 and each end of connecting cable 106 is received through one of the apertures 104 in snare clasp 102 and then knotted so as to engage clasp 102. The ends of third snare group 94 are gripped between gripping surface 60 of primary element 52 and gripping surface 66 of secondary element 54. Allen screws 70 threadingly engage threaded bores 62 in primary element 52 causing the gripping surfaces 60 and 66 of primary element 52 and secondary element 54, respectively, to be pressed together forming a vice-like arrangement to grippingly retain the ends of third snare group 94 therebetween. This method of attaching third snare group 94 to clamp 50 results in an essentially permanent attachment, however, Allen screws 70 can be loosened permitting tension within third snare group 94 to be adjusted, and then Allen screws 70 can be retightened. When Allen screws 70 are tightly engaged in threaded bores 62 in primary element 52, the flat 84 on each screw 76 contacts the gripping surface 60 on the primary element 52 preventing screw 76 from rotating. Clamp 50 is attached to strainer 40 by connecting cables 42. A connecting cable 42 passes through each adjacent pair of cable-receiving bores 64 in primary element 52. The ends of connecting cables 42 are attached to strainer 40, as shown in FIG. 1. The effective length of each connecting cable 42 can be varied with respect to that of the other connecting cable 42 permitting the clamp 50 the be tilted with respect to the strainer 40 allowing the tilt angle of the clamp 50, relative to the snares, to be precisely set.

From the foregoing, it is apparent that by turning hand nut 78 associated with screw 76 of first snare engaging, disengaging and adjusting mechanism 56, first snare group 90 can be rapidly engaged and/or disengaged against snare head 20. Also, the tension within first snare group 90 can be precisely adjusted by turning hand nut 78 associated with screw 76 of mechanism 56. Similarly, by turning hand nut 78 associated with screw 76 of second snare engaging, disengaging and adjusting mechanism 58, second snare group 92 can be rapidly engaged and/or disengaged against snare head 20. Also, the tension within second snare group 92 can be precisely adjusted by turning hand nut 78 associated with screw 76 of the mechanism 58. In each case, screw 76 cannot rotate as its associated hand nut 78 is turned since flat 84 on screw 76 is in firm contact with gripping surface 60 on primary element 52. Lastly, as previously stated, the tension within third snare group 94 can be adjusted by loosening Allen screws 70 so as to release the grip provided on third snare group 94 by the gripping surfaces 60, 62 on primary element 52 and secondary element 54, respectively, and then retightening Allen screws 70. It should be noted, however, that the tension within third snare group 94 is typically not changed after it is initially set.

From the foregoing it is apparent that the first snare engaging, disengaging and adjusting mechanism 56 enables the drummer to rapidly engage and/or disengage the first snare group 90 against the snare head 20 without the use of tools, even when performing on the instrument. This is accomplished by turning the hand nut 78 associated with screw 76 of first snare engaging, disengaging and adjusting mechanism 56 a pre-determined number of turns in a particular direction. For example, turning the hand nut 78 a pre-determined number of turns in the clockwise direction causes the first snare group 90 to engage the snare head 20; whereas turning the hand nut 78 a pre-determined number of turns in the counter-clockwise direction causes the first snare group 92 to become disengaged from the snare head 20. Similarly, the second snare engaging, disengaging and adjusting mechanism 58 enables the drummer to rapidly engage and/or disengage the second snare group 92 against the snare head 20 without the use of tools, even when performing on the instrument. This is accomplished by turning the hand nut 78 associated with screw 76 of second snare engaging, disengaging and adjusting mechanism 58 a pre-determined number of turns in a particular direction. For example, turning the hand nut 78 a pre-determined number of turns in the clockwise direction causes the second snare group 92 to engage the snare head 20; whereas turning the hand nut 78 a pre-determined number of turns in the counter-clockwise direction causes the second snare group 92 to become disengaged from the snare head 20. In addition, by slightly turning the hand nut 78 associated with screw 76 of first snare engaging, disengaging and adjusting mechanism 56 and/or by slightly turning the hand nut 78 associated with screw 76 of second snare engaging, disengaging and adjusting mechanism 58, the tension within first snare group 90 and/or second snare group 92 can be precisely adjusted even during the performance of a musical selection. The precise rapid engagement and/or disengagement of the snares against a snare head without the use of tools is not possible with presently available snare clamping devices. Similarly, the precise rapid adjustment of the tension within the snare groups, without the use of tools, during the performance of a musical selection is not possible with presently available snare clamping devices. Clamp 50 of the present invention permits all of the foregoing (engagement, disengagement and rapid precise adjustment of tension) to be accomplished without the use of tools.

Figure 3:
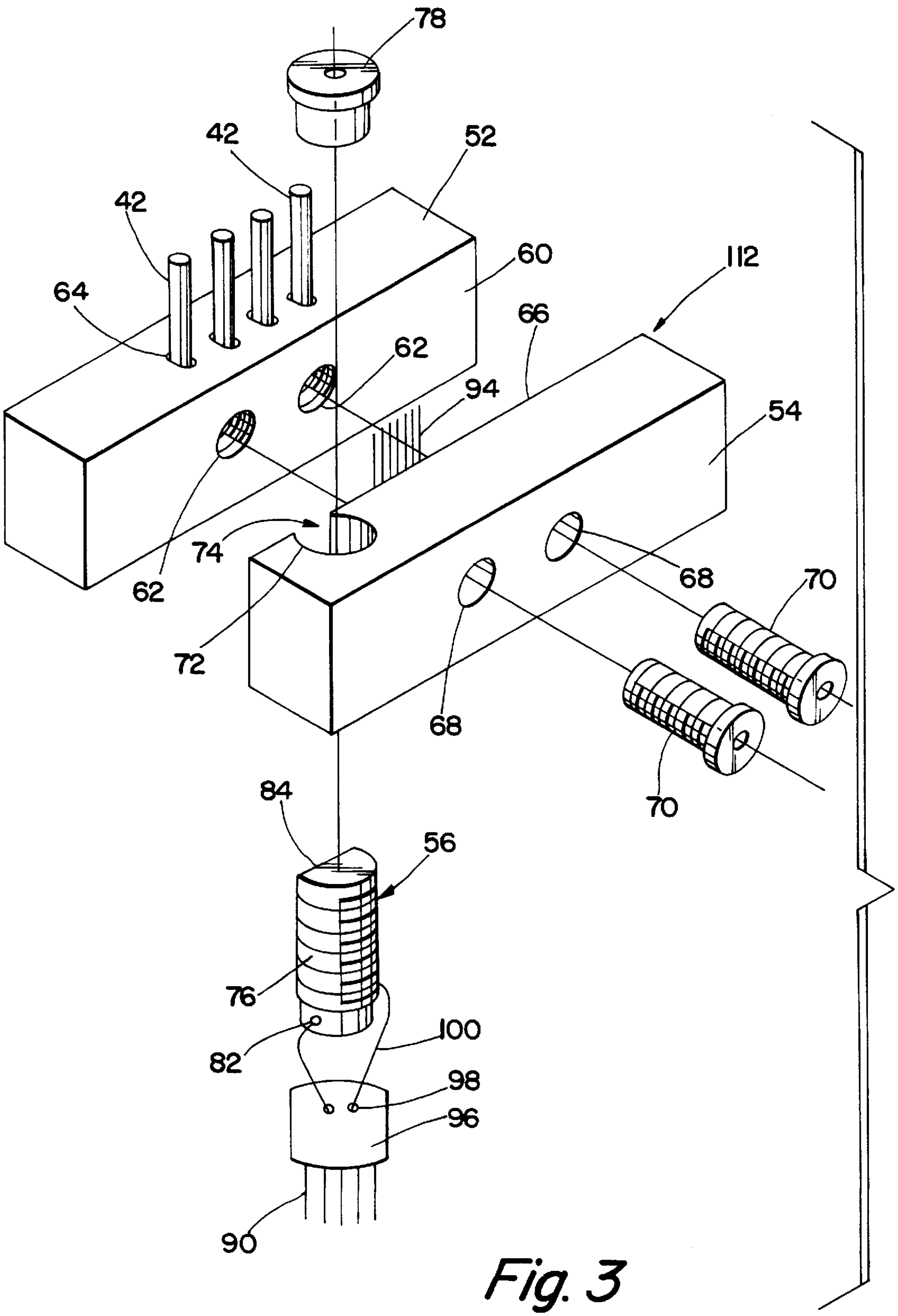
FIG. 3 is an exploded perspective view of a second embodiment of an improved snare clamp of the present invention.

An alternate embodiment of the invention shown in FIG. 2 is illustrated in FIG. 3. In this embodiment, clamp 112 utilizes only a first snare engaging, disengaging and adjusting mechanism 56 and the second snare engaging, disengaging and adjusting mechanism has been deleted therefrom. Clamp 112 would be utilized when only two group of snares are utilized and the tension in only one of the snare groups requires precise adjustment.

Figure 4:
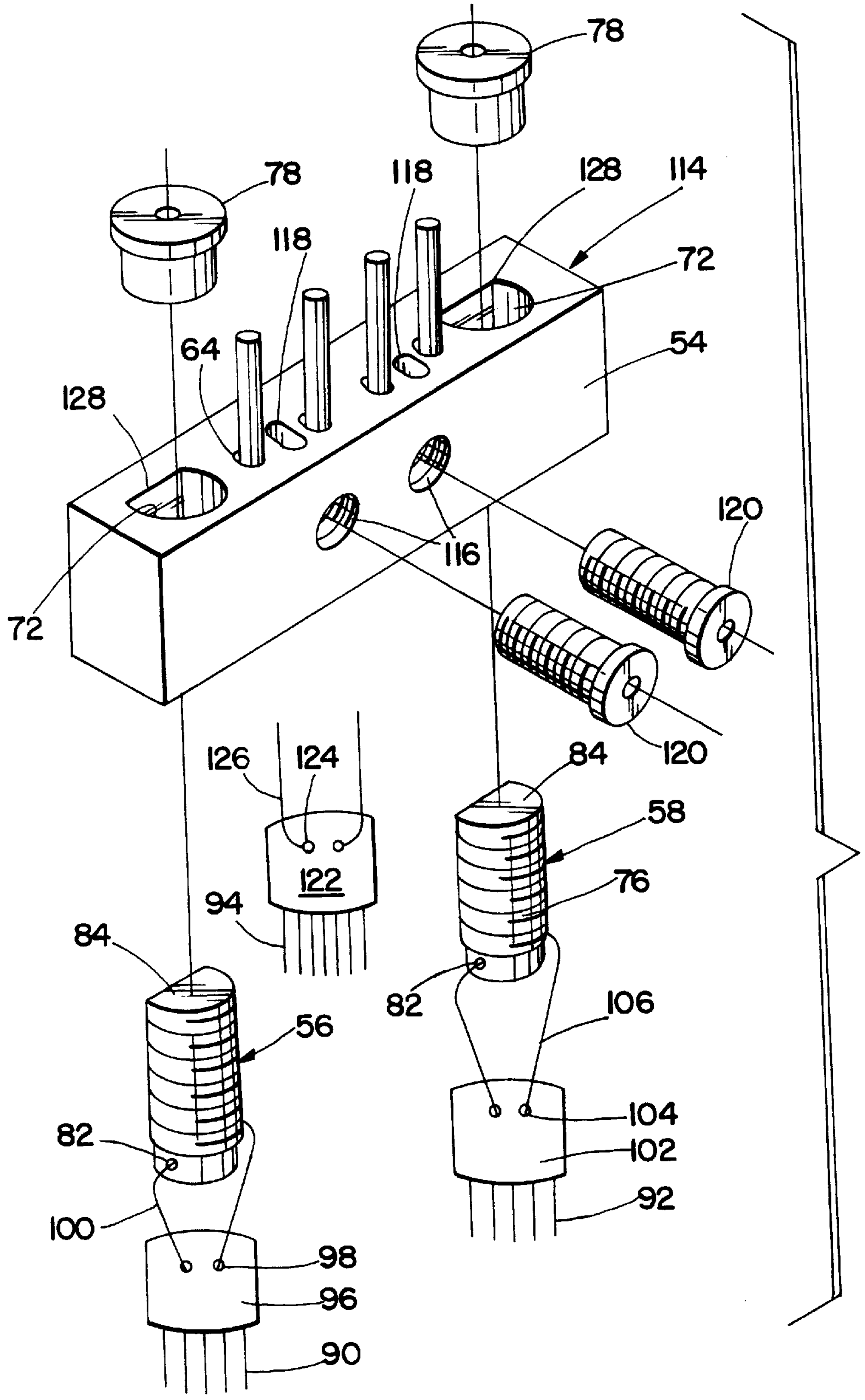
FIG. 4 is an exploded perspective view of a third embodiment of an improved snare clamp of the present invention.

A still another embodiment of the invention disclosed in FIG. 2 is illustrated in FIG. 4. In this embodiment, clamp 114 does not utilize primary element 52, and through bores 68 in secondary element 54 have been replaced by cross-drilled threaded bores 116 which intersect through bores 118 oriented substantially perpendicularly to threaded bores 116. An Allen screw or thumb screw 120 is received within each threaded bore 116. Cable-receiving bores 64 typically positioned within primary element 52 have been transferred to secondary element 54 and are positioned so that a through bore 118 is positioned between each pair or cable-receiving bores 64. In addition, through bores 72 have been transferred to secondary element 54 and are positioned at either end thereof and outwardly of cable receiving bores 64. Each through bore is provided with a broached surface 128 which mates with flat 84 on the screw 76 of its corresponding snare engaging, disengaging and adjusting mechanism. In this embodiment, the ends of third snare group 94 are attached to a snare clasp 122 having spaced-apart apertures 124 therein. A connecting cable 126 is received through apertures 124 to retain snare clasp 122 and each end of connecting cable 126 is received within a bore 118 in secondary element 54 and is retained therein by the Allen screw or thumb screw 120 in its associated threaded bore 116. Clamp 114 is attached to strainer 40 by connecting cables 42. As in the embodiments illustrated in FIGS. 2 and 3, a connecting cable 42 passes through each adjacent pair of cable-receiving bores 64 in secondary element 54, and the ends of connecting cables 42 are attached to strainer 40, as shown in FIG. 1. Also, the effective length of each connecting cable 42 can be varied with respect to that of the other connecting cable 42 permitting the clamp 114 to be tilted with respect to the strainer 40 allowing the tilt angle of the clamp 114, relative to the snares, to be precisely set.

Figure 5:
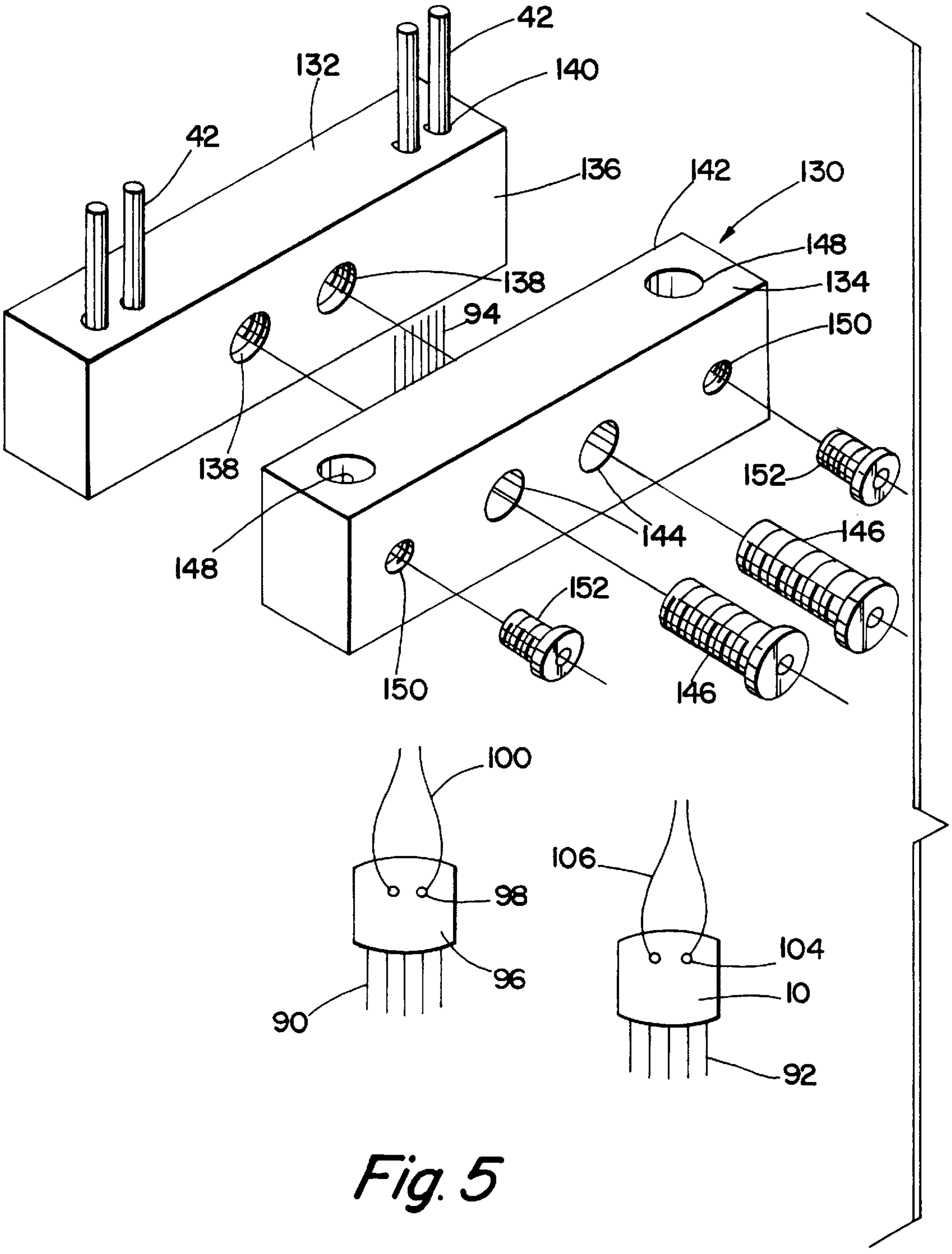
FIG. 5 is an exploded perspective view of a fourth embodiment of an improved snare clamp of the present invention.

A still another embodiment of the present invention is illustrated in FIG. 5 which shows a clamp 130 including a primary element 132 and a secondary element 134. Primary element 132 has a gripping surface 136 and spaced-apart threaded bores 138 formed therein and positioned so as to be substantially perpendicular to gripping surface 136. Two pairs of cable-receiving bores 140 are provided in primary element 132 and are positioned so as to be substantially perpendicular to threaded bores 138 and are located so that a pair of cable-receiving bores 140 is positioned outwardly of each threaded bore 138. Secondary element 134 has a gripping surface 142 positioned so as to operably abut gripping surface 136 of primary element 132. Through bores 144 are formed in secondary element 134 and are positioned therein so as to be coaxially aligned with threaded bores 138 in primary element 132. Allen screws 146 are received within bores 144 in secondary element 134 and threadingly engage threaded bores 138 in primary element 132 causing gripping surface 136 on primary element 132 to be drawn toward gripping surface 142 on secondary element 134 as Allen screws 146 are threadingly advanced within threaded bores 138. With Allen screws 146 operably positioned and threadingly engaging primary element 132, gripping surfaces 136, 142 on primary element 132 and secondary element 134, respectively, are aligned to operably abut one another. A through bore 148 is provided within secondary element 134 adjacent each of the outer ends thereof. The axis of each of the through bores 148 is substantially perpendicular to the axis of bores 144. A cross-drilled threaded blind bore 150 is oriented substantially parallel to the axis of bores 144 and positioned so as to intersect each through bore 148. An Allen screw or thumb screw 152 is provided in each of the threaded blind bores 150.

As in the first embodiment of the present invention illustrated in FIG. 2, the ends of the first snare group 90 are attached to snare clasp 96. Connecting cable 100 is received through apertures 98 in snare clasp 96 and the ends of cable 100 are received within one of the bores 148 in secondary element 134 and are retained therein by the Allen screw or thumb screw 152 in its associated threaded blind bore 150. Similarly, the ends of second snare group 92 are attached to snare clasp 102. Connecting cable 106 is received through apertures 104 in snare clasp 102 and the ends of cable 106 are received within bore 148 located at the other end of secondary element 134 and are retained therein by the Allen screw or thumb screw 152 in its associated threaded blind bore 150. Lastly, the ends of third snare group 94 are gripped between gripping surface 136 of primary element 132 and gripping surface 142 of secondary element 134. Allen screws 146 threadingly engage threaded apertures 138 in primary element 132 causing the gripping surfaces 136, 142 of primary element 132 and secondary element 134, respectively, to be pressed together forming a vise-like arrangement to grippingly retain the ends of third snare group 94 therebetween. Allen screws or thumb screws 152 can be loosened to allow the tension within the first snare group 90 and/or second snare group 92 to be adjusted, and then Allen screws or thumb screws 152 can be retightened. Even though the attachment of third snare group 94 to clamp 130 is essentially a permanent attachment, Allen screws 146 can be loosened to allow the tension within the third snare group 94 to be adjusted, and then Allen screws 146 can be retightened. As in the previous embodiments, clamp 130 is attached to strainer 40 by a connecting cable 42 passing through each adjacent pair of cable-receiving bores 140 provided in primary element 132. Ends of connecting cables 42 are attached to strainer 40. Also, as in the previous embodiments, the effective length of each connecting cable 42 can be varied with respect to that of the other connecting cable 42 permitting the clamp 130 to be tilted with respect to the strainer allowing the tilt angle of the clamp 130, relative to the snares, to be precisely set.

Figure 6:
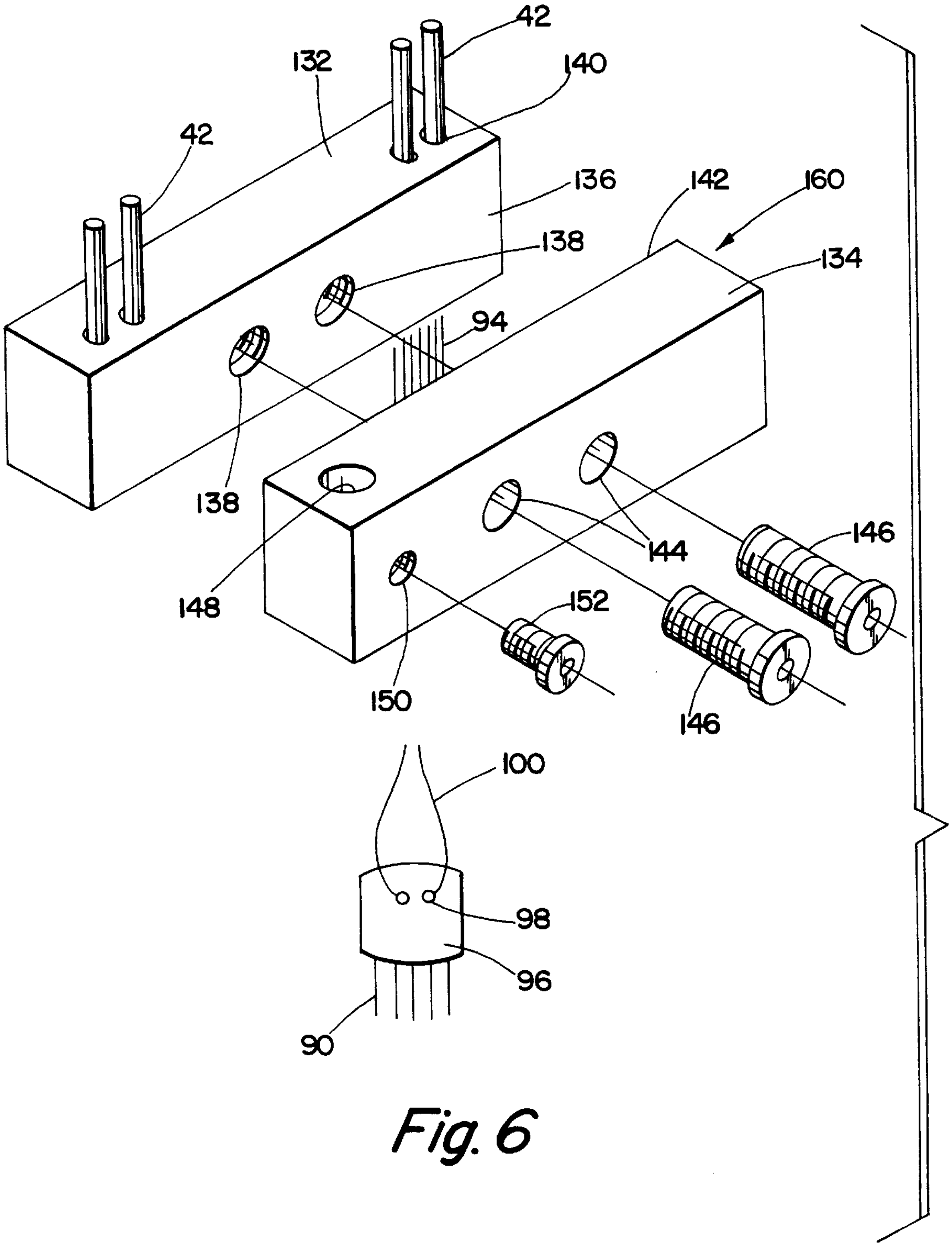
FIG. 6 is an exploded perspective view of a fifth embodiment of an improved snare clamp of the present invention.

An alternate embodiment of the invention shown in FIG. 5 is illustrated in FIG. 6. In this embodiment, clamp 160 utilizes only one, rather than two, through bores 148 to receive the connecting cable for a snare group. In all other respects, clamp 160 operates in the same manner as clamp 130 but is utilized when only two groups of snares, rather than three snare groups, are to be secured.

Figure 7:
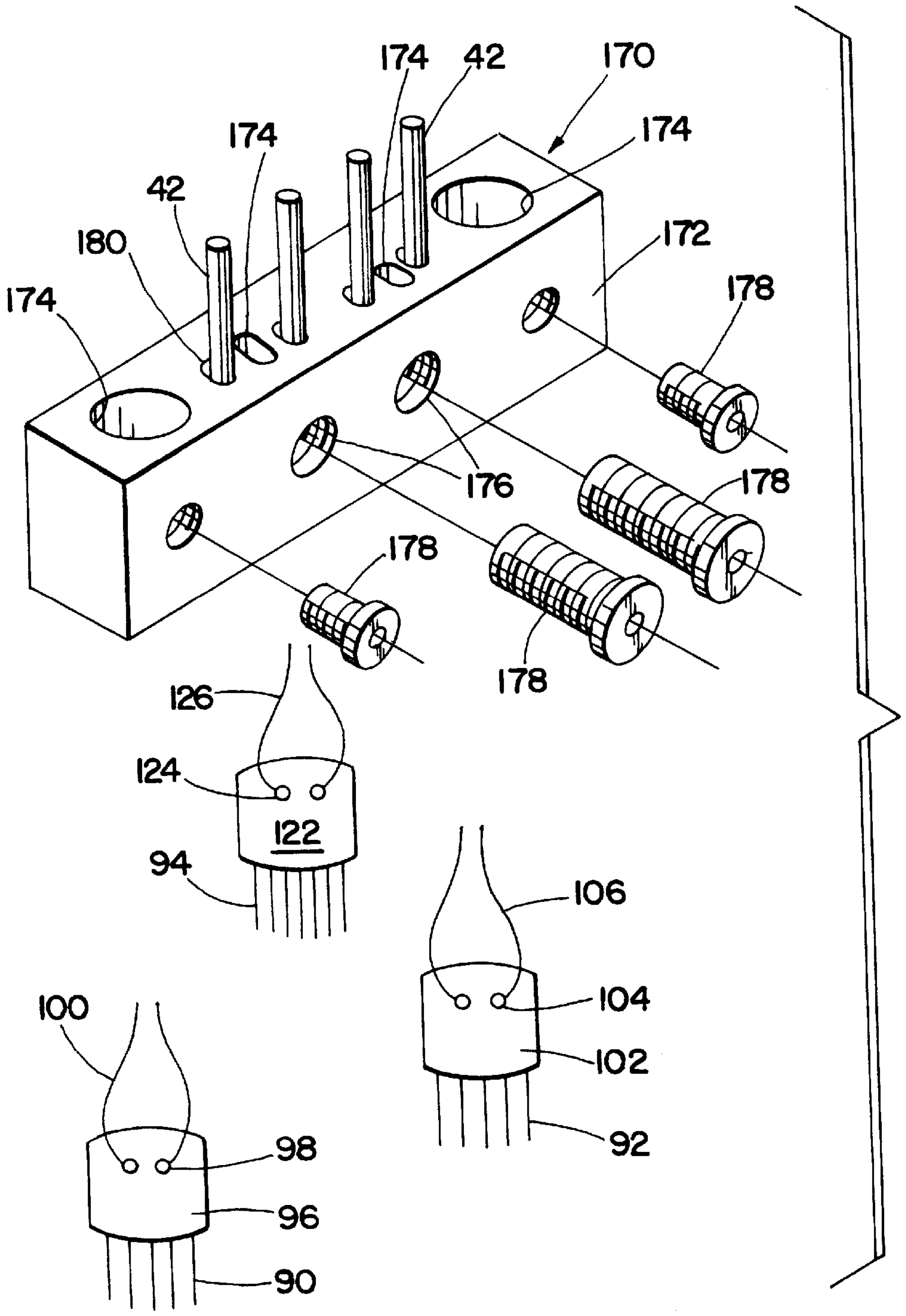
FIG. 7 is an exploded perspective view of a sixth embodiment of an improved snare clamp of the present invention.

A still another embodiment of the present invention is illustrated in FIG. 7 which shows a clamp 170 including a singular element 172 having a plurality of spaced-apart through bores 174 passing therethrough. A cross-drilled threaded bore 176 intersects each bore 174 and is positioned so as to be substantially perpendicular to the axis of its associated bore 174. An Allen screw or thumb screw 178 is threadingly received within each threaded bore 176. Cable-receiving bores 180 are positioned on opposite sides of each of the innermost bores 174. In this embodiment, the ends of connecting cable 100 for first snare group 90 are received within one of the bores 174 located adjacent an end of the singular element 172 and the ends of connecting cable 106 for second snare group 92 are received within the bore 174 located at the other end of the singular element 172. After the connecting cable ends have been received within their respective bores 174, Allen screws or thumb screws 178 are tightened retaining the cable ends within their respective bores 174. The ends of the connecting cable 126 for the third snare group 94 are received through the innermost bores 174 in singular element 172 and are retained therein by Allen screws or thumb screws 178 in its associated threaded bore 176. In this case, a connecting cable 42 is received through each pair of cable-receiving bores 180 and the ends of the connecting cables 42 are attached to strainer 40. Here again, as in the previous embodiment, the effective length of each connecting cable 42 can be varied with respect to that of the other connecting cable 42 permitting the clamp 170 to be tilted with respect to the strainer allowing the tilt angle of the clamp 170, relative to the snares, to be precisely set.

Figure 8:
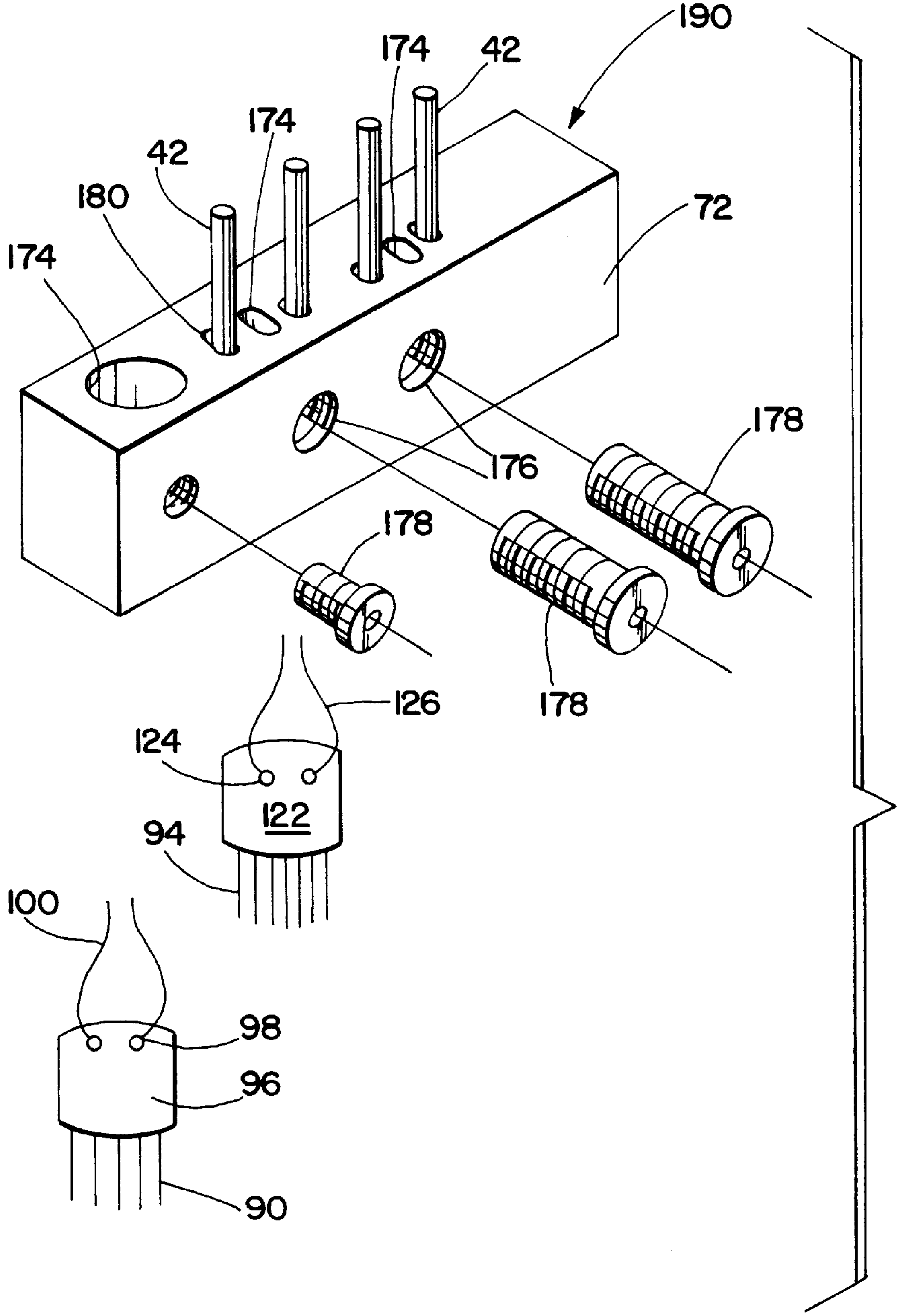
FIG. 8 is an exploded perspective view of a seventh embodiment of an improved snare clamp of the present invention.

An alternate embodiment of the clamp shown in FIG. 7 is clamp 190 illustrated in FIG. 8. In this embodiment, one of the through bores 174 and its associated threaded bore 176 have been deleted. Therefore, clamp 190 is utilized to retain two groups of snares, rather than three snare groups. In this manner, this clamp is similar to the embodiments shown in FIGS. 3 and 6.

Figure 9:
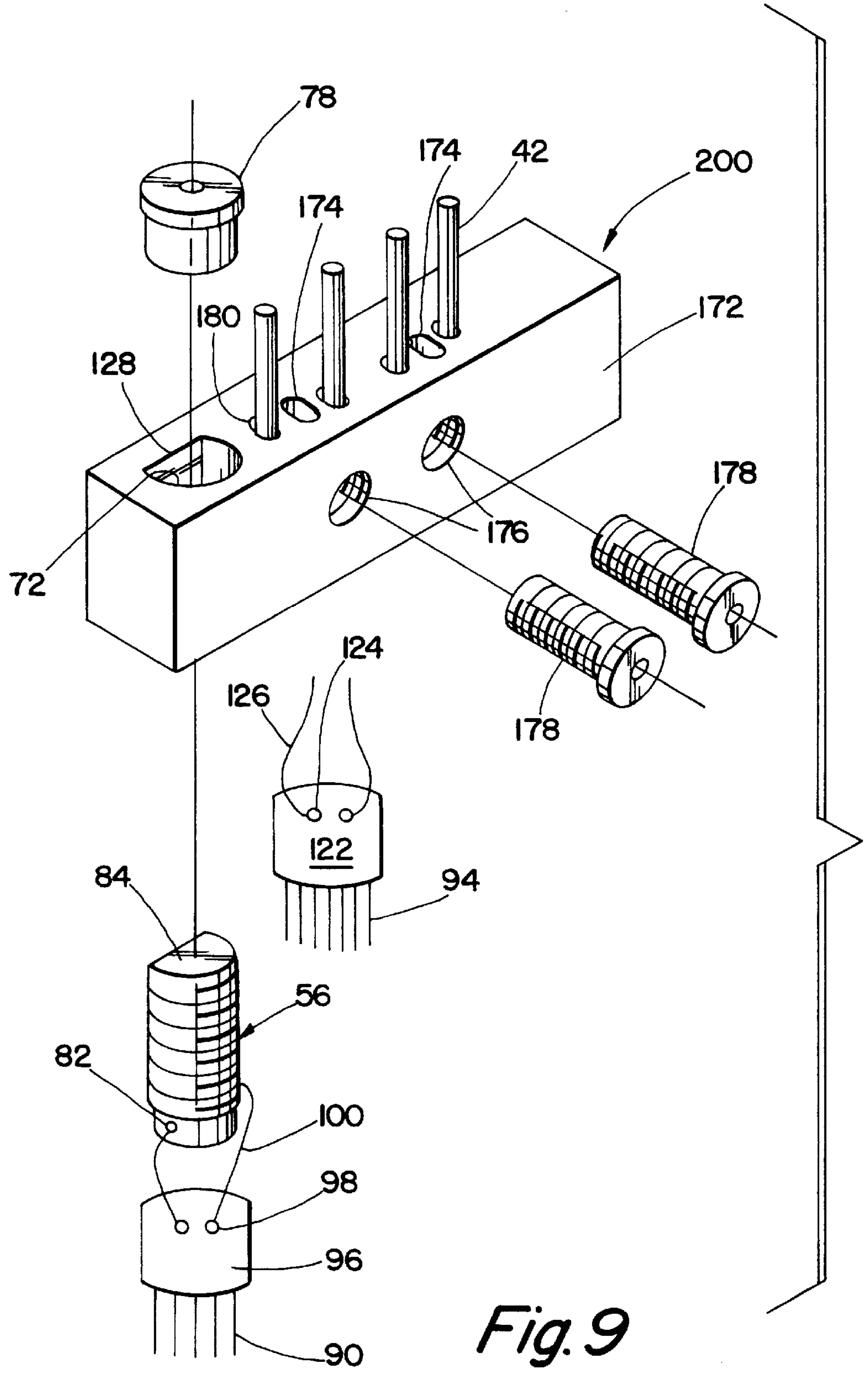
FIG. 9 is an exploded perspective view of an eighth embodiment of an improved snare clamp of the present invention.

Another embodiment of the present invention is clamp 200 shown in FIG. 9 which, in essence, combines the snare engaging, disengaging and adjustment feature illustrated in FIGS. 2, 3 and 4 and the utilization of a singular clamp element illustrated in FIGS. 7 and 8. It is apparent from the foregoing, that the snare engaging, disengaging and adjustment feature shown in FIGS. 2, 3 and 4 can be readily combined with the features of the singular element shown in FIGS. 7 and 8 to provide an almost limitless number of combinations in which snares can be engaged, disengaged and/or adjusted against a snare head.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A clamp for engaging and disengaging one or more groups of snares against a snare head on a snare drum comprising:

a first member having a gripping surface thereon;

a second member having a gripping surface thereon and adjustably coupled to said first member, said second member cooperating with said first member to grippingly retain a first group of snares between said gripping surfaces on said first and second members; said second member also having at least one aperture therein, the longitudinal axis of said at least one aperture being substantially parallel to said gripping surface on said second member;

a threaded connector received within said at least one aperture in said second member and being operatively attached to a second group of snares;

means for threadably engaging said threaded connector, rotation of said threadably engaging means resulting in lateral movement of said threaded connector within said second member; and means for preventing the rotation of said threaded connector relative to said second member.

2. The clamp as defined in claim 1 wherein said at least one aperture is positioned in said second member so that a portion of said aperture intersects said gripping surface on said second member and is substantially adjacent to said gripping surface on said first member when said second member and said first member are in an abutting relationship.

3. The clamp as defined in claim 2 wherein said threaded connector has a flat surface on a portion thereof, said flat surface being oriented so as to be substantially adjacent to said gripping surface on said first member when said second member and said first member are in an abutting relationship.

4. The clamp as defined in claim 3 wherein said flat surface on said threaded connector contacts said gripping surface on said first member preventing rotation of said threaded connector when said second member and said first member are in an abutting relationship.

5. The clamp as defined in claim 3 wherein said threaded connector has an aperture within one end thereof, the axis of said aperture being substantially parallel to the plane of said flat surface on said threaded connector.

6. The clamp as defined in claim 5 further including a connecting cable received within said aperture in said threaded connector and attached to said second group of snares.

7. The clamp as defined in claim 1 wherein rotation of said threadably engaging means in a first direction causes lateral movement of said threaded connector in a first direction within said second member resulting in the engagement of said second group of snares against said snare head of said snare drum.

8. The clamp as defined in claim 1 wherein rotation of said threadably engaging means in a second direction causes lateral movement of said threaded connector in a second direction within said second member resulting in the disengagement of said second group of snares from said snare head of said snare drum.

9. A clamp for engaging and disengaging one or more groups of snares against a snare head on a snare drum comprising a member having at least one first aperture therein for the receipt of first means for operatively attaching a first group of snares to said member, at least one second aperture located within said member and positioned adjacent said at least one first aperture for the receipt of second means for operatively attaching a second group of snares to said member, means for engaging and disengaging said first and second snare groups to said member, said engaging and disengaging means comprising a threaded connector received within said at least one second aperture in said member and including means for preventing the rotation of said threaded connector relative to said member, said threaded connector having a flat surface on a portion thereof and having an aperture in one end thereof, said flat surface cooperating with said at least one second aperture preventing rotation of said threaded connector relative to said member, said axis of said aperture in said one end of said threaded connector being substantially parallel to the plane of said flat surface on said threaded connector.

10. A clamp for engaging and disengaging one or more groups of snares attached to a snare drum comprising a first member, a second member, means for adjustably coupling said second member to said first member, actuation of said coupling means causing said second member to cooperate with said first member to grippingly engage a first group of snares positioned between said coupling means, and at least one means for attaching a second group of snares to said second member, said at least one attaching means being positioned outwardly of said coupling means and engaging a connecting cable operatively attached to said second group of snares.

11. A clamp for engaging and disengaging one or more groups of snares against a snare head on a snare drum comprising a member having at least one first aperture therein for the receipt of first means for operatively attaching a first group of snares to said member, at least one second aperture located within said member and positioned adjacent said at least one first aperture for the receipt of second means for operatively attaching a second group of snares to said member, and means for engaging and disengaging said first and second snare groups to said member, said engaging and disengaging means comprising a threaded connector received within said at least one second aperture in said member.

12. The clamp as defined in claim 9 including a connecting cable received within said aperture in said one end of said threaded connector and attached to at least one of said first and second snare group engaging and disengaging means.

* * * * *